(12) United States Patent
Welton et al.

(10) Patent No.: US 7,165,065 B1
(45) Date of Patent: Jan. 16, 2007

(54) MULTIDIMENSIONAL DATABASE STORAGE AND RETRIEVAL SYSTEM

(75) Inventors: Caleb E. Welton, Malden, MA (US); Albert A. Hopeman, Arlington, MA (US); Andrew H. Goldberg, Newton Centre, MA (US)

(73) Assignee: Oracle Corporation, Redwood Shores, CA (US)

( * ) Notice: Subject to any disclaimer, the term of this patent is extended or adjusted under 35 U.S.C. 154(b) by 440 days.

(21) Appl. No.: 09/616,643

(22) Filed: Jul. 14, 2000

(51) Int. Cl.
*G06F 17/30* (2006.01)

(52) U.S. Cl. ............... 707/4; 707/2; 707/10; 707/101; 707/102

(58) Field of Classification Search .......... 707/1–10, 707/100, 102, 200, 205, 503, 104.1, 101; 711/216
See application file for complete search history.

(56) References Cited

U.S. PATENT DOCUMENTS

| | | | | |
|---|---|---|---|---|
| 5,319,777 A * | 6/1994 | Perez | ............... | 707/10 |
| 5,359,724 A * | 10/1994 | Earle | ............... | 707/205 |
| 5,404,510 A * | 4/1995 | Smith et al. | ............... | 707/2 |
| 5,430,869 A * | 7/1995 | Ishak et al. | ............... | 707/101 |
| 5,592,666 A * | 1/1997 | Perez | ............... | 707/102 |
| 5,604,854 A * | 2/1997 | Glassey | ............... | 707/503 |
| 5,701,467 A * | 12/1997 | Freeston | ............... | 707/100 |
| 5,799,300 A * | 8/1998 | Agrawal et al. | ............... | 707/5 |
| 5,890,151 A * | 3/1999 | Agrawal et al. | ............... | 707/5 |
| 5,926,820 A * | 7/1999 | Agrawal et al. | ............... | 707/2 |
| 5,943,677 A | 8/1999 | Hicks | ............... | 707/205 |
| 5,983,220 A * | 11/1999 | Schmitt | ............... | 707/5 |
| 6,163,774 A * | 12/2000 | Lore et al. | ............... | 707/2 |
| 6,223,182 B1 * | 4/2001 | Agarwal et al. | ............... | 707/102 |
| 6,272,498 B1 * | 8/2001 | Muthukrishnan et al. | ............... | 707/102 |

(Continued)

OTHER PUBLICATIONS

Shukla, Amit et al., "Storage Estimation for Multidimensional Aggregates in the Presence of Hierarchies", Proceedings of the 22nd VLDB Conference Mumbai (Bombay), India 1996, pp. 522-531.*

(Continued)

*Primary Examiner*—Shahid Alam
(74) *Attorney, Agent, or Firm*—Chapin IP Law, LLC; Barry W. Chapin, Esq.

(57) ABSTRACT

In a multidimensional database, an aggregation operation is performed in an optimal manner by storing the values included in the/aggregation operation on the same disk page. A sparsity manager determines aggregate values that are computed from other data values during the aggregation operation. Each aggregate value is associated with one or more data values that are used during the aggregation operation to compute the aggregate value. The sparsity manager stores the associated data values in proximity to each other, such as on the same disk page, so that multiple disk page fetches may not be required for the same set of data values during the aggregation operation. The data values used in the aggregation operation can therefore be fetched once from a disk page, and thereafter are found in memory, such as on a cache page corresponding to the disk page. In this manner, multiple fetches for the same disk page during the aggregation operation are avoided.

16 Claims, 11 Drawing Sheets

U.S. PATENT DOCUMENTS

| | | |
|---|---|---|
| 6,282,546 B1 * | 8/2001 | Gleichauf et al. .......... 707/102 |
| 6,289,352 B1 * | 9/2001 | Proctor ...................... 707/102 |
| 6,381,596 B1 * | 4/2002 | Bayer ............................ 707/4 |
| 6,381,605 B1 * | 4/2002 | Kothuri et al. ............. 707/100 |
| 6,385,604 B1 * | 5/2002 | Bakalash et al. .............. 707/3 |
| 6,408,292 B1 * | 6/2002 | Bakalash et al. .............. 707/2 |
| 6,493,718 B1 * | 12/2002 | Petculescu et al. ......... 707/102 |
| 6,721,760 B1 * | 4/2004 | Ono et al. ............... 707/104.1 |

OTHER PUBLICATIONS

Srivastava, Jaideep et al., "TBSAM: An Access Method for Efficient Processing of Statistical Queries", IEEE Transactions On Knowledge And Data Engineering, vol. 1, No. 4, Dec. 1989, pp. 414-423.*

Agrawal, Rakesh et al., "Modeling Multidimensional Databases", Proceedings of the 13th International Conference on Data Engineering, Apr. 7-11, 1997, pp. 232-243.*

Furtado, Pedro et al., "Summary Grids: Building Accurate Multi-dimensional Histograms", Proceedings of the 6th International Conference on Database Systems for Advanced Applications, Apr. 19-21, 1999, pp. 187-194.*

* cited by examiner

Coal

|        | Jan | Feb | Mar | Apr | May | Jun |
|--------|-----|-----|-----|-----|-----|-----|
| Miami  | <   | S P A R S E |   |   |   | >   |
| LA     | <   | S P A R S E |   |   |   | >   |
| Nome   | 7   | 7   | 6   | 4   | 2   | 0   |
| Bos    | 10  | 10  | 9   | 7   | 3   | 0   |

FIG. 8a

Ice

|        | Jan | Feb | Mar | Apr | May | Jun |
|--------|-----|-----|-----|-----|-----|-----|
| Miami  | 6   | 6   | 7   | 8   | 8   | 9   |
| LA     | 3   | 4   | 4   | 5   | 5   | 7   |
| Nome   | <   | S P A R S E |   |   |   | >   |
| Bos    | <   | S P A R S E |   |   |   | >   |

| | 40 Sales | 42 Volume | 44 Position |
|---|---|---|---|
| 46 | V (Bos, Jan) | = 7 | (1) |
| | V (Bos, Feb) | = 7 | (2) |
| | V (Bos, Mar) | = 6 | (3) |
| | V (Bos, Apr) | = 4 | (4) |
| | V (Bos, May) | = 2 | (5) |
| | V (Bos, Jun) | = 0 | (6) |
| | V (Nome, Jan) | = 10 | (7) |
| | V (Nome, Feb) | = 10 | (8) |
| | V (Nome, Mar) | = 9 | (9) |
| | V (Nome, Apr) | = 7 | (10) |
| | V (Nome, May) | = 3 | (11) |
| | V (Nome, Jun) | = 0 | (12) |
| 48 | V (Bos, Q1) | V (Bos, Jan) + V (Bos, Feb) + V (Bos, Mar)<br>= 7  + 7  + 6  = 20 | (13) |
| | V (Bos, Q2) | V (Bos, Apr) + V (Bos, May) + V (Bos, Jun)<br>= 4  + 2  + 0  = 6 | (14) |
| | V (Nome, Q1) | V (Nome, Jan) + V (Nome, Feb) + V (Nome, Mar)<br>= 10  + 10  + 9  = 29 | (15) |
| | V (Nome Q2) | V (Nome, Apr) + V (Nome, May) + V (Nome, Jun)<br>= 7  + 3  + 0  = 10 | (16) |
| 50 | V (Bos, 1st half '00) | V (Bos, Q1) + V (Bos, Q2)<br>= 20  + 6  = 26 | (17) |
| | V (Nome, 1st half) | V (Nome, Q1) + V (Nome, Q2)<br>= 29  + 10  = 39 | (18) |

*FIG. 10a*

| Sales ⟨40 | Volume ⟨42 | Position ⟨44 |
|---|---|---|
| V (E, Jan) | V (Bos, Jan) + V (Miami, Jan)<br>= 7    + 0    = 7 | (19) |
| V (E, Feb) | V (Bos, Feb) + V (Miami, Feb)<br>= 7    + 0    = 7 | (20) |
| V (E, Mar) | V (Bos, Mar) + V (Miami, Mar)<br>= 6    + 0    = 6 | (21) |
| V (E, Apr) | V (Bos, Apr) + V (Miami, Apr)<br>= 4    + 0    = 4 | (22) |
| V (E, May) | V (Bos, May) + V (Miami, May)<br>= 2    + 0    = 2 | (23) |
| V (E, Jun) | V (Bos, Jun) + V (Miami, Jun)<br>= 0    + 0    = 0 | (24) |
| V (W, Jan) | V (Nome, Jan) + V (LA, Jan)<br>= 10    + 0    = 10 | (25) |
| V (W, Feb) | V (Nome, Feb) + V (LA, Feb)<br>= 10    + 0    = 10 | (26) |
| V (W, Mar) | V (Nome, Mar) + V (LA, Mar)<br>= 9    + 0    = 9 | (27) |
| V (W, Apr) | V (Nome, Apr) + V (LA, Apr)<br>= 7    + 0    = 7 | (28) |
| V (W, May) | V (Nome, May) + V (LA, May)<br>= 3    + 0    = 3 | (29) |
| V (W, Jun) | V (Nome, Jun) + V (LA, Jun)<br>= 0    + 0    = 0 | (30) |

*FIG. 10b*

| Sales (40) | Volume (42) | Position (44) |
|---|---|---|
| V (E, Q1) | = V (Bos, Q1) + V (Miami, Q1)<br>= 20 + NA = 20 | (31) |
| V (E, Q2) | = V (Bos, Q2) + V (Miami, Q2)<br>= 6 + NA = 6 | (32) |
| V (W, Q1) | = V (Nome, Q1) + V (Nome, Q1)<br>= 29 + NA = 29 | (33) |
| V (W, Q2) | = V (Nome, Q2) + V (Nome, Q2)<br>= 10 + NA = 10 | (34) |
| V (E, 1st half) | = V (Bos, 1st half) + V (Miami, 1st half)<br>= 26 + NA = 26 | (35) |
| V (W, 1st half) | = V (Nome, 1st half) + V (Nome, 1st half)<br>= 39 + NA = 39 | (36) |
| V (US, Jan) | = V (E, Jan) + V (W, Jan)<br>= 7 + 10 = 17 | (37) |
| V (US, Feb) | = V (E, Feb) + V (W, Feb)<br>= 7 + 10 = 17 | (38) |
| V (US, Mar) | = V (E, Mar) + V (W, Mar)<br>= 6 + 9 = 15 | (39) |
| V (US, Apr) | = V (E, Apr) + V (W, Apr)<br>= 4 + 7 = 11 | (40) |
| V (US, May) | = V (E, May) + V (W, May)<br>= 2 + 3 = 5 | (41) |
| V (US, Jun) | = V (E, Jun) + V (W, Jun)<br>= 0 + 0 = 0 | (42) |
| V (US, Q1) | = V (E, Q1) + V (W, Q1)<br>= 20 + 29 = 49 | (43) |
| V (US, Q2) | = V (E, Q2) + V (W, Q2)<br>= 6 + 10 = 16 | (44) |
| V (US, 1st half) | = V (E, 1st half) + V (W, 1st half)<br>= 26 + 39 = 65 | (45) |

MULTIDIMENSIONAL DATABASE STORAGE AND RETRIEVAL SYSTEM

BACKGROUND

Relational databases are known which are used to store large quantities of normalized data. Traditional relational databases store data in the form of relations. A primary key is used to correspond to queried values. For a given primary key, there is associated data arranged in a two-dimensional form. Queries are performed by defining query values to be searched in the primary key, and traversing the relations to find the desired information.

Many applications, however, have a need to structure data in multiple dimenstions. In multi-dimensional databases, data values are located at points in an n-dimensional conceptual space defined by specific positions along one or more axes. For example, three axes specifying month, product and sales district would delineate a three-dimensional space containing sales data. Each individual dollar value for sales would be identified by the combination of one specific point along each axis: the sales value for a specific month, product and sales district. The n-dimensional space can be visualized as a data cube.

In the relational database, this example would be modeled by constructing a single primary key based on the month, product, and sales districts with an additional column for the value being stored. The relational model, therefore, requires additional space because it is storing the primary key as part of each row, and is further inefficient with respect to queries within a given subplane of the cube, such as accessing all rows where sales district is limited to a specific value.

In a typical multi-dimensional data cube, a storage location is allocated for every possible combination of every dimensional value. For example, in a three-dimensional data cube wherein each dimension has three possible values, 27 storage locations are allocated, one for each possible combination of the dimensional values. The lowest level detail data is typically provided by data entry and each upper level data cell is then computed by aggregating the detail data to fill in the data cube. To speed access time for users, the data cube can be stored in main memory.

In many multi-dimensional data cubes, especially large ones with many different dimensions, there are certain combinations of dimensional values for which there are relatively few data values. For example, if a data cube contains sales values dimensioned by product, region, and time, there may not be any sales values for certain products in certain regions during at least some time periods. In large multi-dimensional databases having several dimensions, it is fairly common for most of the data cube to be empty. Indeed, certain financial data may be much less than one percent populated.

Dimensions having many dimensional value combinations for which there are relatively few data values are referred to as "sparse." For sparse dimensions, it is wasteful to allocate storage space for each possible combination of dimensional values because many of the combinations will contain no data values. Instead, storage space can be allocated only for those dimensional combinations having data values. The problem of efficiently allocating storage space in a multi-dimensional data cube is referred to as "sparsity management." Sparsity management may include combining multiple dimensional attributes into a composite tuple which allows several sparse dimensions to be combined, thereby saving storage space.

Further, many dimensions define data values that are combinations of other data values. For example, in the sales data above, the time dimension might include attributes for months, quarters, and years, in which the data values for "January," "February," and "March" are combined for the data value for "Quarter 1." Similarly, the data values for the four quarters are combined, or aggregated, to compute the value for "Year." Such attributes that are combinations of other attributes define a hierarchy of associated data values, in which the data values corresponding to one attribute include the values in other attributes Often, computing the data values that are aggregated from other associated data values can be time consuming. Data values used in computing the aggregate values may not be stored in the same area of the storage medium. Retrieving the data values from the storage medium, such as a disk, for example, may require many fetches. The aggregation operation which computes the aggregate values may have to iterate through many associated data values. Multiple and often redundant fetches may need to be performed to fetch values stored on the same disk page. These additional fetches increase the time and resources required to complete the aggregation operation. In a large multidimensional database, such increases can be substantial.

SUMMARY

In a multidimensional database, an aggregation operation is performed in an optimal manner by storing the values included in the aggregation operation on the same disk page. A sparsity manager determines aggregate values which are computed from other data values during the aggregation operation. Each aggregate value is associated with one or more data values which are used during the aggregation operation to compute the aggregate value. The sparsity manager stores the associated data values in proximity to each other, such as on the same disk page (or a few disk pages), so that multiple disk page fetches may not be required for the same set of data values during the aggregation operation. The data values used in the aggregation operation can therefore be fetched once from a common disk page, and thereafter are found in memory, such as on a common cache page corresponding to the common disk page. In this manner, multiple fetches for data on the same disk page during the aggregation operation are avoided.

The associations between the aggregate values and the corresponding data values define a hierarchy having parent-child relationships. The composite tuples used to store the data values are arranged so that the child values corresponding to a particular parent, or aggregate, value are stored adjacent to each other. The sparsity manager traverses the hierarchy defined by the associations, and sorts the data values such that, for each aggregate value, the associated child values are stored together.

The aggregate values are computed from their associated child values. Such a computation can be performed in an offline mode, such as overnight, or computed interactively in realtime. Further, an aggregate value can itself include other aggregate values. Therefore, by storing the data values associated with an aggregate value together, the associated data values used to compute each aggregate value are likely to be stored on the same page or sets of pages, providing optimal disk I/O.

BRIEF DESCRIPTION OF THE DRAWINGS

The foregoing and other objects, features and advantages will be apparent from the following more particular description of embodiments of the multidimensional database storage and retrieval system, as illustrated in the accompanying drawings in which like reference characters refer to the same parts throughout the different views. The drawings are not necessarily to scale, emphasis instead being placed upon illustrating the principles of the claimed invention.

DETAILED DESCRIPTION

Figure 1:
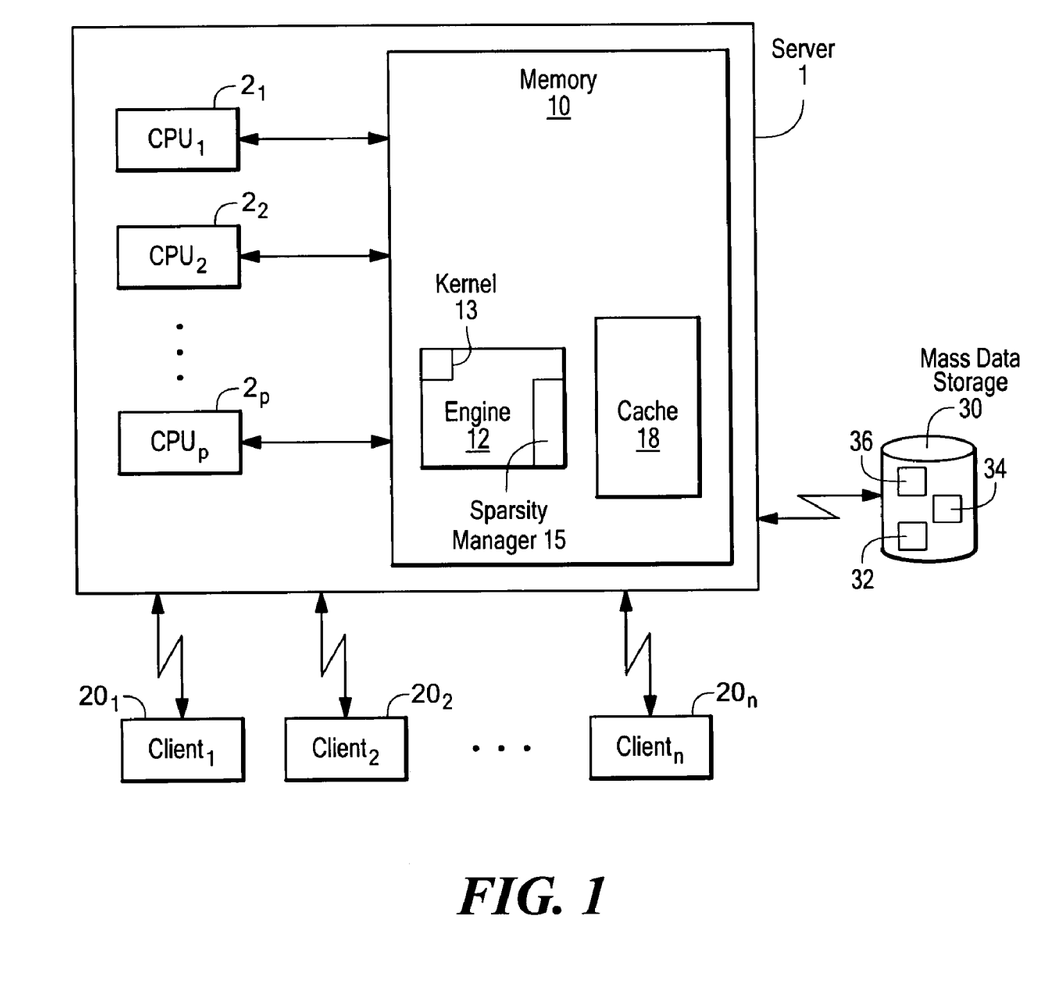
FIG. 1 is a schematic block diagram of an on-line analytic processing (OLAP) system.

FIG. 1 is a schematic block diagram of an on-line analytic processing (OLAP) system. A server 1 responds to requests from a plurality of client users $20_1, 20_2, \ldots, 20_n$. To satisfy client requests, the server 1 retrieves data from a data storage warehouse 30, which can include various databases, such as relational databases 32, multi-dimensional databases 34 and temporary databases 36 stored on disk. In particular, the multi-dimensional databases 34 are embodiments of a multi-cube model, where each data measure, such as "sales" or "expense" or "margin", has only the dimensions it needs.

The server 1 includes at least one central processing unit (CPU) $2_1, 2_2, \ldots, 2_p$. The CPUs 2 execute client or user sessions and system management processes to operate on data stored in memory 10, which includes an OLAP engine 12 and a cache memory 18. The OLAP engine 12 includes a kernel 13 and a sparsity manager 15.

The user sessions and system management processes can include processing threads managed in a multi-threaded OLAP engine 12. That is, user sessions can accomplish tasks by asynchronously executing processing threads. The disclosed embodiments can take the form of computer-executable instructions embedded in a computer-readable format on a CD-ROM, floppy or hard disk, or another computer-readable distribution medium. These instructions are executed by one or more CPUs $2_1, 2_2, \ldots, 2_p$ to implement the OLAP engine 12. A particular embodiment of the OLAP engine is commercially available as Oracle Express Server, version 6.3.1, from Oracle Corporation.

Figure 2:
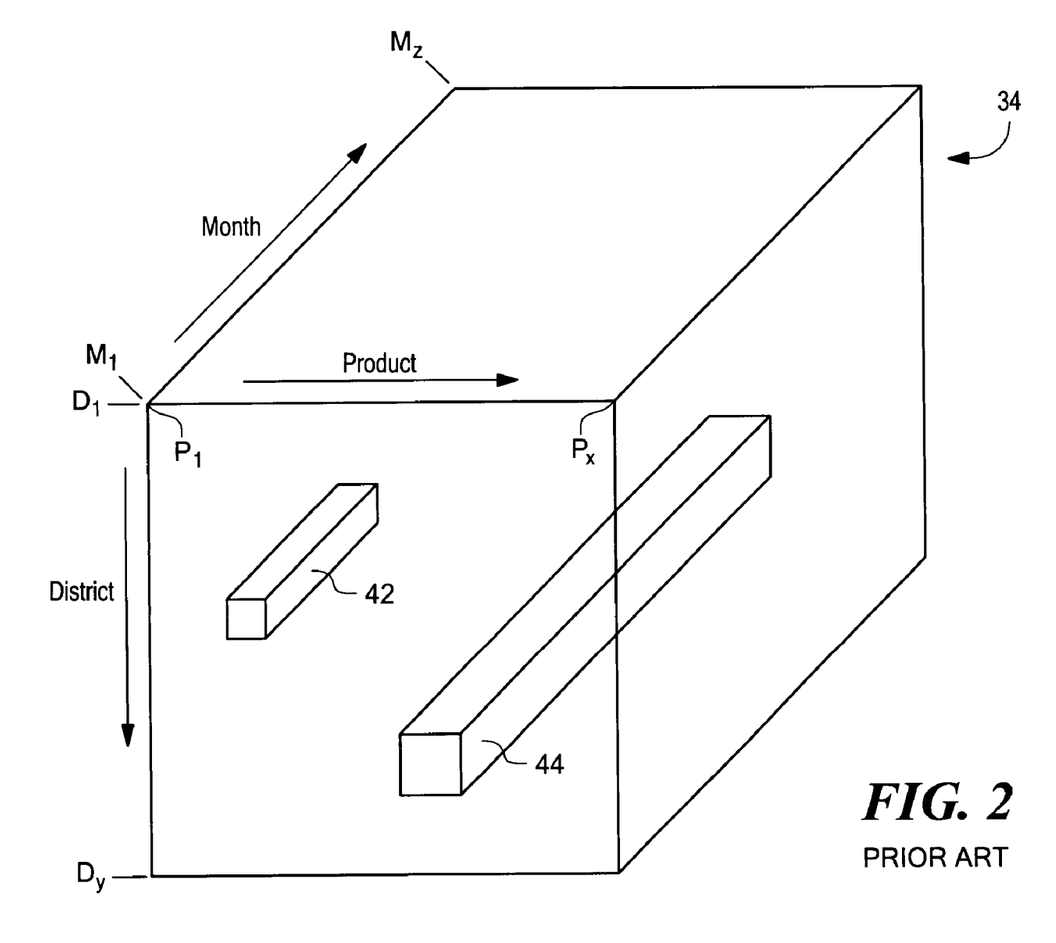
FIG. 2 is a schematic block diagram of a prior art data cube depicting a multidimensional database.

FIG. 2 is a schematic block diagram of a prior art data cube. As illustrated, the data cube 34 has three axes, District, Product and Month dimensions, to store data representing sales over time. The Product dimension includes dimension values $P_1-P_x$; the District dimension includes dimension values $D_1-D_y$; and the Month dimension includes dimension values $M_1-M_z$. A data cell is defined to be the intersection of the three axes dimension values in the data cube 34. The example data cube 34, therefore, has a volume V of data cells given by:

$$(x) \times (y) \times (z)$$

Although there are V data cells defined by the data cube, all data cells may not be populated with data. In fact, in many dimensions, the data cube may be sparsely populated. As an illustration, subsections 42, 44 of the data cube may be the only populated regions of the data cube 34. By allocating storage for the entire cube volume V, there may be unused storage space. It is therefore desirable to reduce the amount of wasted storage allocation.

Figure 3A:
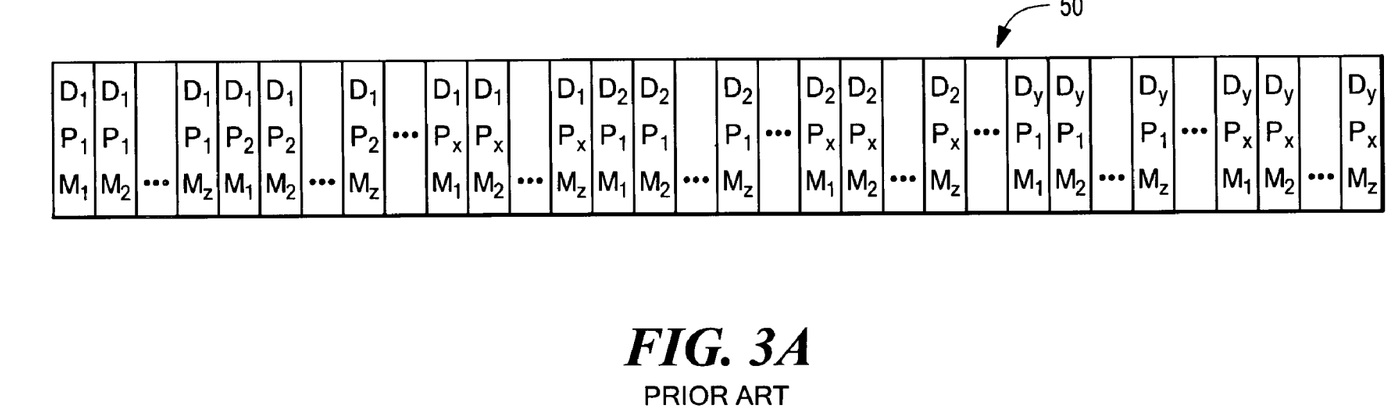
FIGS. 3a and 3b are schematic block diagrams of a prior art storage array for storing the multidimensional database of FIG. 2.
Figure 3B:
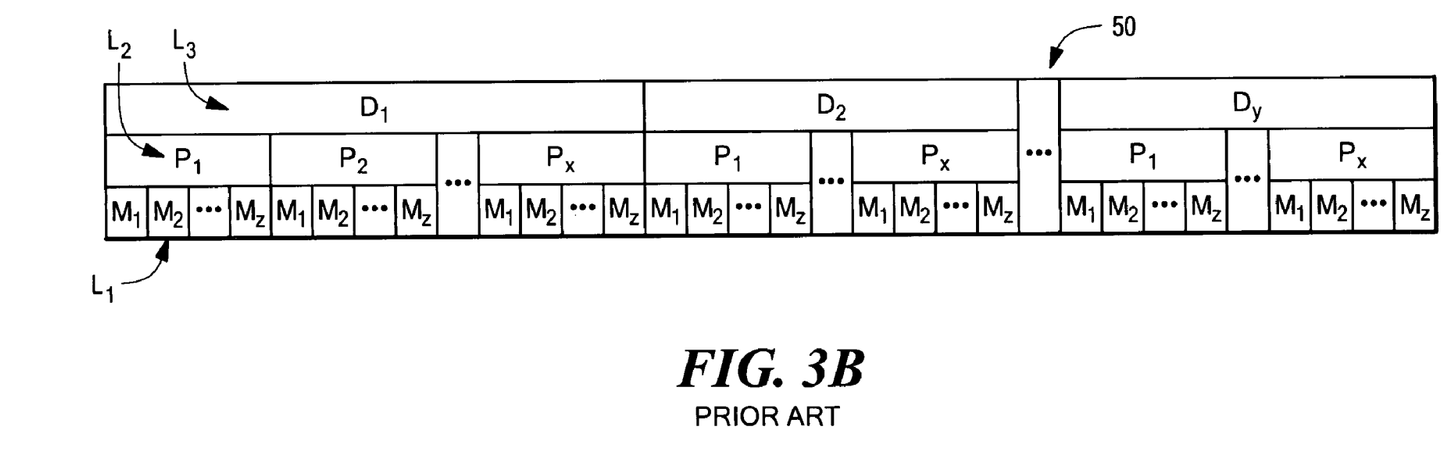

FIGS. 3A–3B are schematic diagrams of a prior art storage array for storing the data cube of FIG. 2. As illustrated in FIG. 3A, each combination of dimension values in the array 50 is allocated a storage cell. It is advantageous to represent the array 50 in such a way that data values frequently accessed together are physically stored near each other. For example, if data for all months for a given Product-District pair were commonly to be used together (for example, to calculate a year-to-date total for that Product and District), then access would be speeded by storing all months together for each combination of Product and District. This establishes a default looping order for the dimensions of the data cube wherein Month varies fastest. Other access patterns might then dictate that Products vary within Districts, making District the slowest varying dimension.

FIG. 3B is an alternative representation of the storage array 50 of FIG. 3A, more clearly depicting the rate of change of the dimensions. As more clearly depicted, the lowest (fastest) detail level $L_1$ is the Month level, the middle level $L_2$ is the Product level, and the upper (slowest) level $L_3$ is the District level.

In a practical data cube there would likely be lower levels (e.g., day values) and higher levels (e.g., states, regions). As the number of levels increases, the storage requirements of the databases increases exponentially. Thus, sparse data at the lowest detail level propagates to large areas of unused storage. To reduce the amount of wasted storage, the storage structure can be compressed to reduce or eliminate sparse data storage or empty data cells.

As an example, consider a company that sells ice and coal products throughout the country. Two districts serviced by the company are Nome, Ak., and Miami, Fla. The company tracks sales by month and the database is first created in April using the January-March data given below in Table I.

TABLE I

|  | Ice | Coal |
|---|---|---|
| January: | | |
| Nome | 0 | 10 |
| Miami | 6 | 0 |
| . . . | | |
| February: | | |
| Nome | 0 | 10 |
| Miami | 6 | 0 |
| . . . | | |
| March: | | |

TABLE I-continued

|  | Ice | Coal |
|---|---|---|
| Nome | 0 | 9 |
| Miami | 10 | 0 |
| ... | | |

Figures 4, 5:
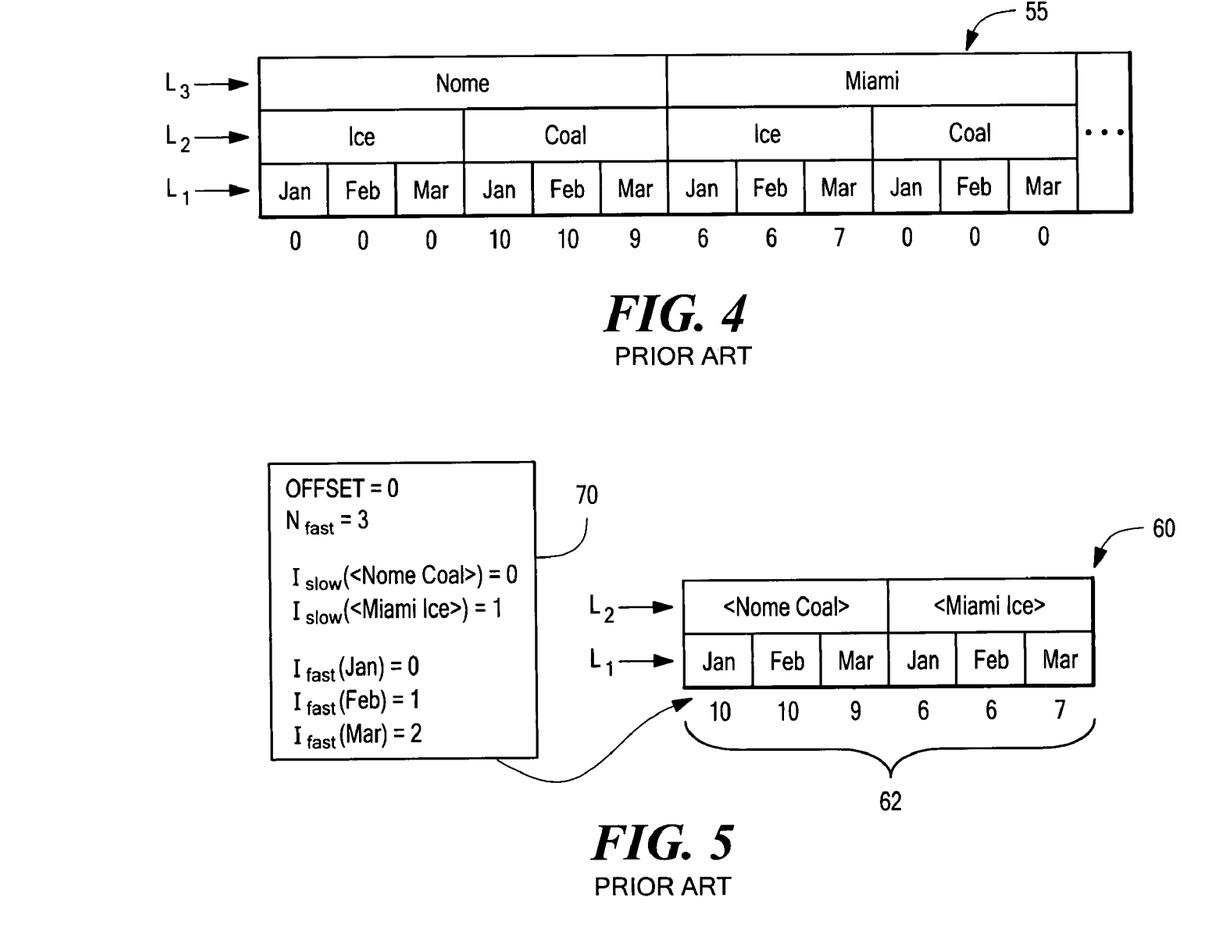
FIG. 4 is a prior art storage array for storing the data of table I below.
FIG. 5 is a sparse storage descriptor for storing the sparse array segment corresponding to the data of FIG. 4.

FIG. 4 is a schematic diagram of a prior art storage scheme for the data in Table I. The data is stored in a linearized array 55 of data cells, indexed by values of the three dimensions. Because there were no sales in either month for ice in Nome and coal in Miami, there are unused storage cells. These six empty cells could be eliminated from the storage scheme without affecting the integrity of the data in the database 34.

The sparse data is typically represented in a manner that avoids actual allocation of storage locations for data values corresponding to unused combinations of attributes, or tuples. In such a multidimensional database, the sparse data is often stored in a composite tuple structure which provides storage space only for data values that are actually populated. Creation and management of composite tuples is described in further detail in U.S. patent application No. 5,943,677, entitled "Sparsity Management for Multi-Dimensional Databases," assigned to the assignee of the present application and incorporated herein by reference.

FIG. 5 shows a storage array for storing the sparse data of FIG. 4 in a composite tuple. A composite tuple combines dimensions having unused tuples into a single composite dimension, in this example <Nome coal> and <Miami ice>. No storage allocation is required for the unused tuples <Nome ice> and <Miami coal>.

Since the composite tuples representing sparse data define storage locations only for data values that are actually populated, the memory allocation and indexing for accessing the sparse data may not conform to the data cube model described above with reference to FIGS. 3a and 3b, which allocate a storage location for every possible tuple, or combination of dimensions, in the multidimensional database. Rather, a Cartesian compound descriptor 70 is used to index into a storage array 60 to index the sparse data values 62. A plurality of storage arrays 60, each indexed through a Cartesian compound descriptor 70, may therefore be employed to represent the sparse data segments in a multidimensional database. Such sparse data segments may correspond to the subsections 42, 44 of populated data in the data cube model of FIG. 2.

The Cartesian compound descriptors reference a storage array 60 stored in an arbitrary location in the memory 10 or in the cache 18 (FIG. 1). The data corresponding to the entire data cube may not be stored in the linear, contiguous array manner depicted in FIGS. 3a and 3b. Accordingly, an aggregation operation may not assume, for example, that data residing at the lowest level, L1 (FIG. 4) my be aggregated by summing consecutive locations. Rather, the Cartesian compound descriptors 70 are used to index the data values at an arbitrary storage location in the memory 10 and cache 18 (FIG. 1). Many references to different Cartesian compound descriptors 70 indexing different storage arrays 60 may be invoked in an aggregation operation involving sparse data.

Figure 6:
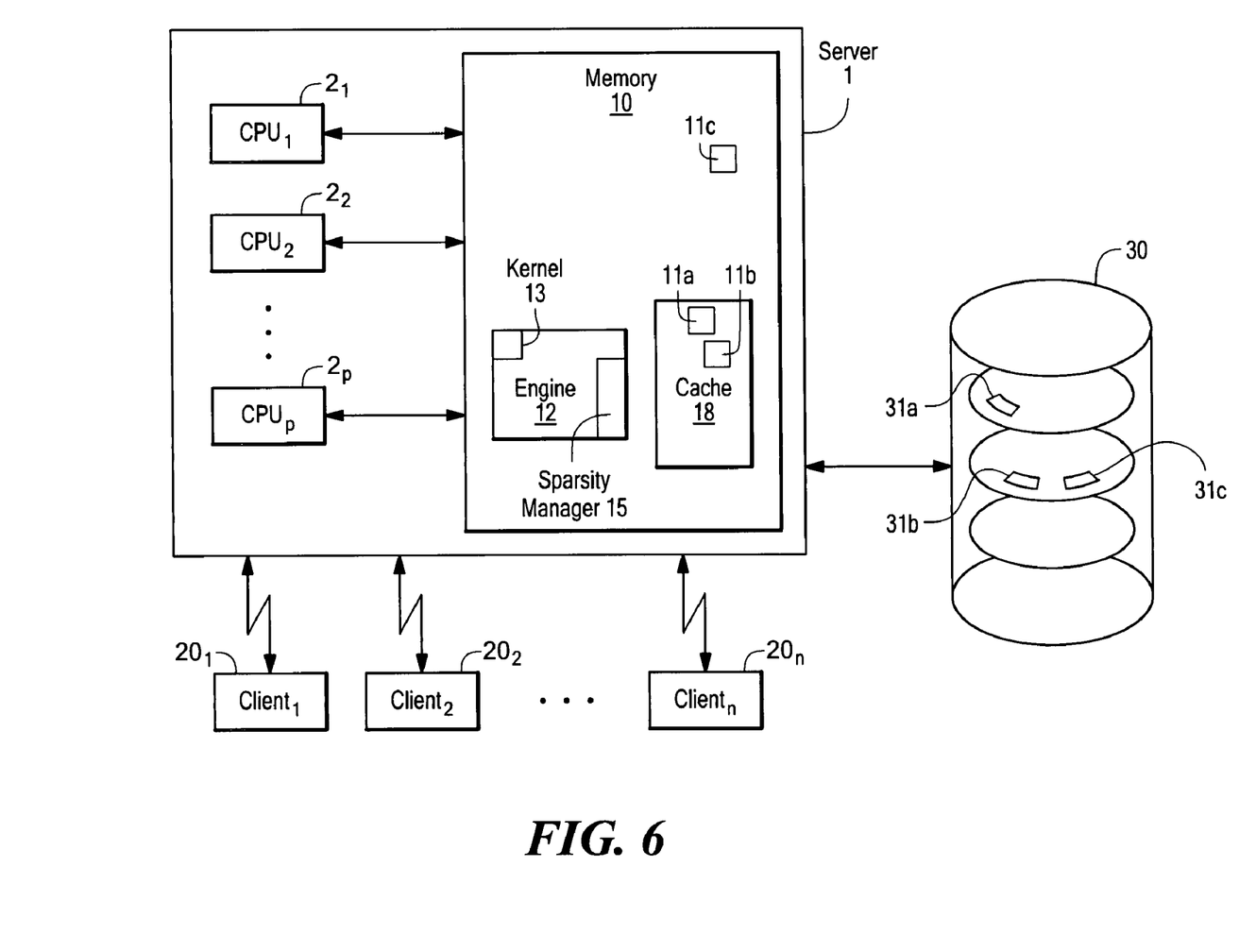
FIG. 6 is a more detailed view of the OLAP system for storing aggregate data values.

FIG. 6 shows an OLAP system for storing sparse data in a manner which minimizes I/O retrieval during an aggregation operation. Sparse data is represented on a storage device 30, as storage segments 31a–31c, such pages on a disk. Each of the storage segments 31 generally, corresponds to a memory page 11a–11c in the memory 10 and cache 18. The cache 18 is a high-speed area of memory adapted to store storage segments which are statistically likely to be fetched within a short time interval. Since the storage device 30 contains many more storage segments than can be stored in the memory 10, the memory pages 11 are transferred to and from the corresponding storage segments 31 as they are requested. The sparsity manager 15 stores the associated, or child, values corresponding to an aggregate, or parent, value in proximity to each other on the storage device 30, and optimally, adjacent to other child values on the same storage segment 31. When an aggregation operation requests an associated value, other associated values also needed for the corresponding aggregate value will also be fetched, as will be described in further detail below.

Figure 7A:
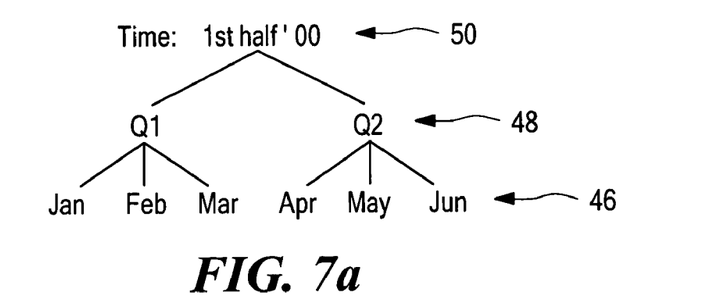
FIGS. 7a and 7b are examples of a hierarchy of values within a dimension.
Figure 7B:
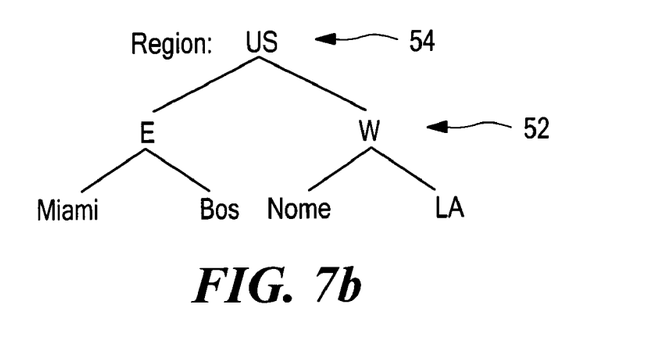
Figure 8A:
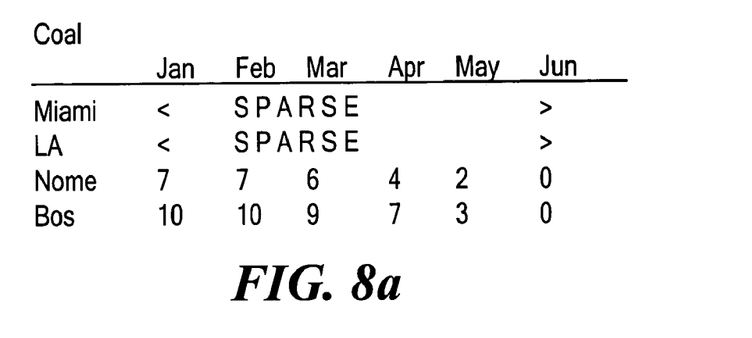
FIGS. 8a and 8b are examples of sparse data for populating the hierarchy of FIGS. 7a and 7b.

In FIGS. 7a and 7b, hierarchies of attributes for the time and region dimensions are shown, respectively. The data values corresponding to these dimensions is shown in FIG. 8a for the product coal and in FIG. 8b for the product ice. Referring to FIG. 7a, the data values for January (Jan), February (Feb), and March (Mar) are aggregated to Q1. The data values for April (Apr), May (May), and June (Jun) are aggregated to Q2. Similarly, the data values for Q1 and Q2 are aggregated to the data value for $1^{st}$ half '00. In the region dimension, data values for Miami and Boston (Bos) are aggregated for East (E), while Nome and LA are aggregated for West (W). E and W are aggregated for US. In FIGS. 7a and 7b, the data values at the bottom level of the hierarchy are defined as quantifiable entities, called detail values. The higher levels are defined as an aggregation of the lower levels, and are called aggregate values because they are computed from the data values of other attributes.

Figure 8B:
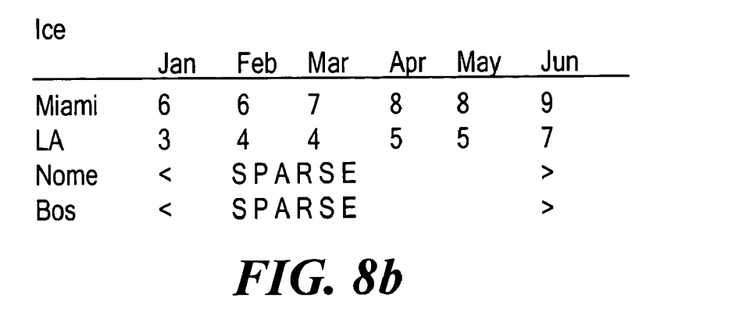

In FIGS. 8a and 8b the data values corresponding to the detail values of the hierarchies of FIGS. 7a and 7b are shown. During an aggregation operation, defined further below, the data values corresponding to each of the attributes are traversed in the order defined by the hierarchy. For example, to aggregate the aggregate value corresponding to the attribute Q1, the detail values for the attributes Jan, Feb, and Mar are traversed. By storing the detail values for Jan, Feb, and Mar on the same storage segment, a single fetch can be performed to satisfy the aggregation of Q1.

Figure 9:
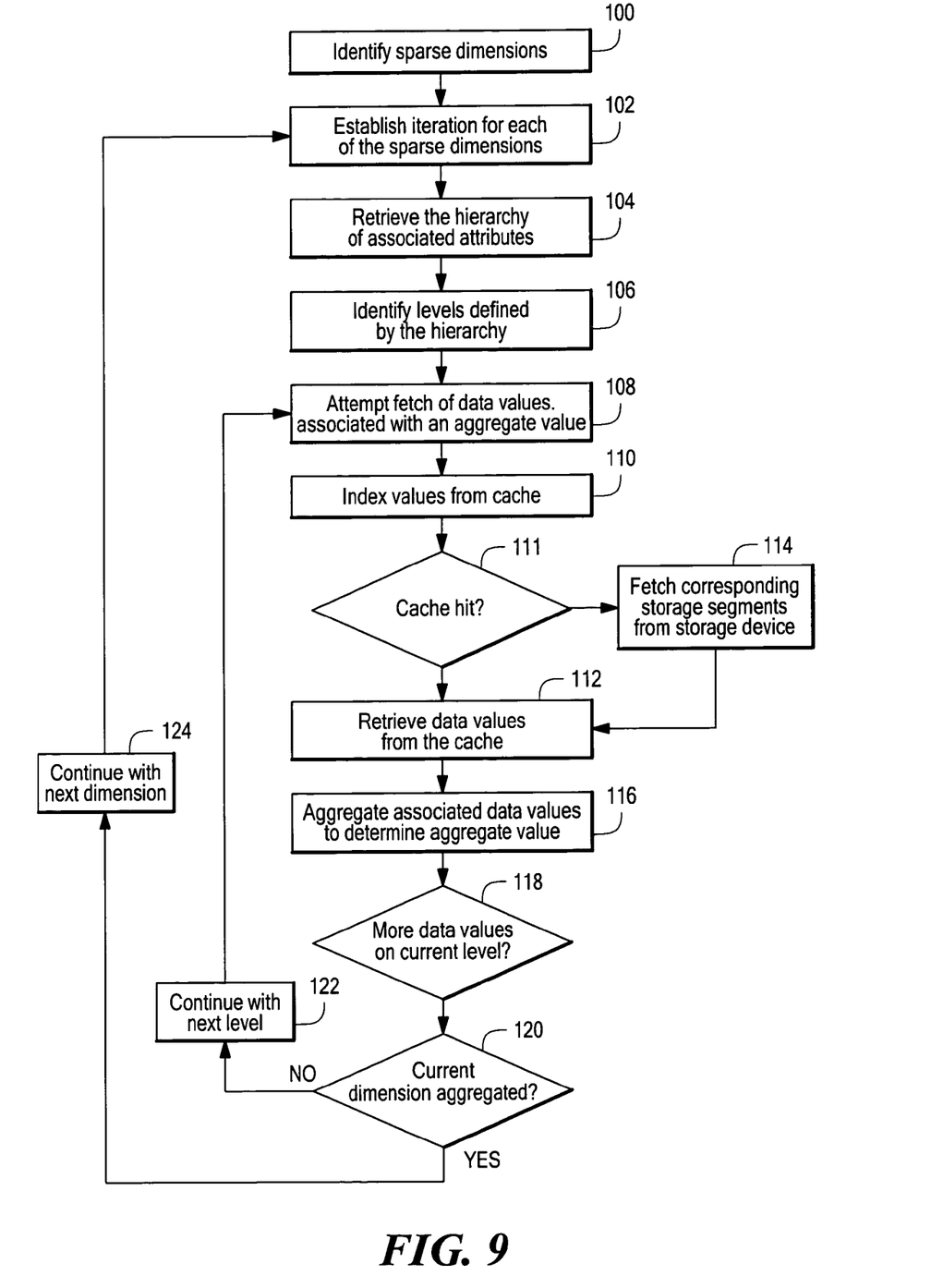
FIG. 9 shows a flowchart depicting the storing of data values.

A flowchart depicting the aggregation process is shown in FIG. 9. Referring to FIGS. 6 and 9, each of the sparse dimensions having a hierarchy of attributes is identified, as shown at step 100. An iteration for each of the sparse dimensions is established, as depicted at step 102. Within each sparse dimensions, the hierarchy of associated attributes is retrieved, as disclosed at step 104. The levels defined by the hierarchy are identified, as shown at step 106. For each level within the hierarchy, an attempt is made to fetch the data values associated with an aggregate value, as disclosed at step 108. First, a cache index is performed to attempt to retrieve the values from the cache 18, as shown at step 110. If there is a cache hit, as determined at step 111; the data values are retrieved from the cache, as shown at step 112. If the data values are not found in the cache, a fetch is performed to retrieve the corresponding storage segments 31 from the storage device 30, as disclosed at step 114. The associated data values are aggregated to determine the aggregate value, as described at step 116. If there are more data values on the current level associated with aggregate values on the next level, execution continues at step 108, as depicted at step 118. The data values associated with the next aggregate value are likely to have been fetched previously, and will therefore tend be found in the cache 18.

If the levels of the current dimension have not been fully aggregated, as determined at step 120, execution continues with the next level of the hierarchy, as shown at step 122. When all levels of the current hierarchy of the current dimension have been aggregated, as determined at step 120, execution continues with the next dimension, as depicted at step 124. In this manner, all the data values in the database are aggregated while minimizing disk I/O.

The aggregation operation defined in FIG. 9 optimizes disk I/O because the data values used in computing the aggregate values are stored adjacently to each other, as will be described further below. Therefore, a retrieval operation that results in a fetch of a storage segment 31 from the storage device 30 is likely to fetch other data values associated with the same aggregate value. Accordingly, successive retrievals of data values are likely to be found in the cache.

In one embodiment, all the data values associated with an aggregate value or level of aggregate values are stored on the same storage element in the storage medium. In such an embodiment, a single fetch is performed to retrieve all the data values required for aggregation of a particular aggregate value or level of aggregate values. Many factors affect the storage locations of data values on the storage medium. Factors such as number of associated data values corresponding to an aggregate value, the number of aggregate values on a level, and the physical size of the storage element, as well as others, all affect the data values that are retrieved in a single fetch operation. Further, there is rarely a direct mapping from data values associated with an aggregate value or a hierarchy level to a storage element. Often the data values associated with an aggregate value or a hierarchy level may span several storage elements, or an individual storage element may contain the data values associated with several aggregate values. The number of storage elements reflected in the cache also affects whether a particular data value will be found in the cache. Accordingly, it is an objective to store the data values on the storage medium in an order such that the likelihood of retrieving a data value from the cache are optimized, since many of the data values returned from a fetch will likely be used in an aggregation before the cache entry in which they are stored expires from the cache.

Figure 10A:
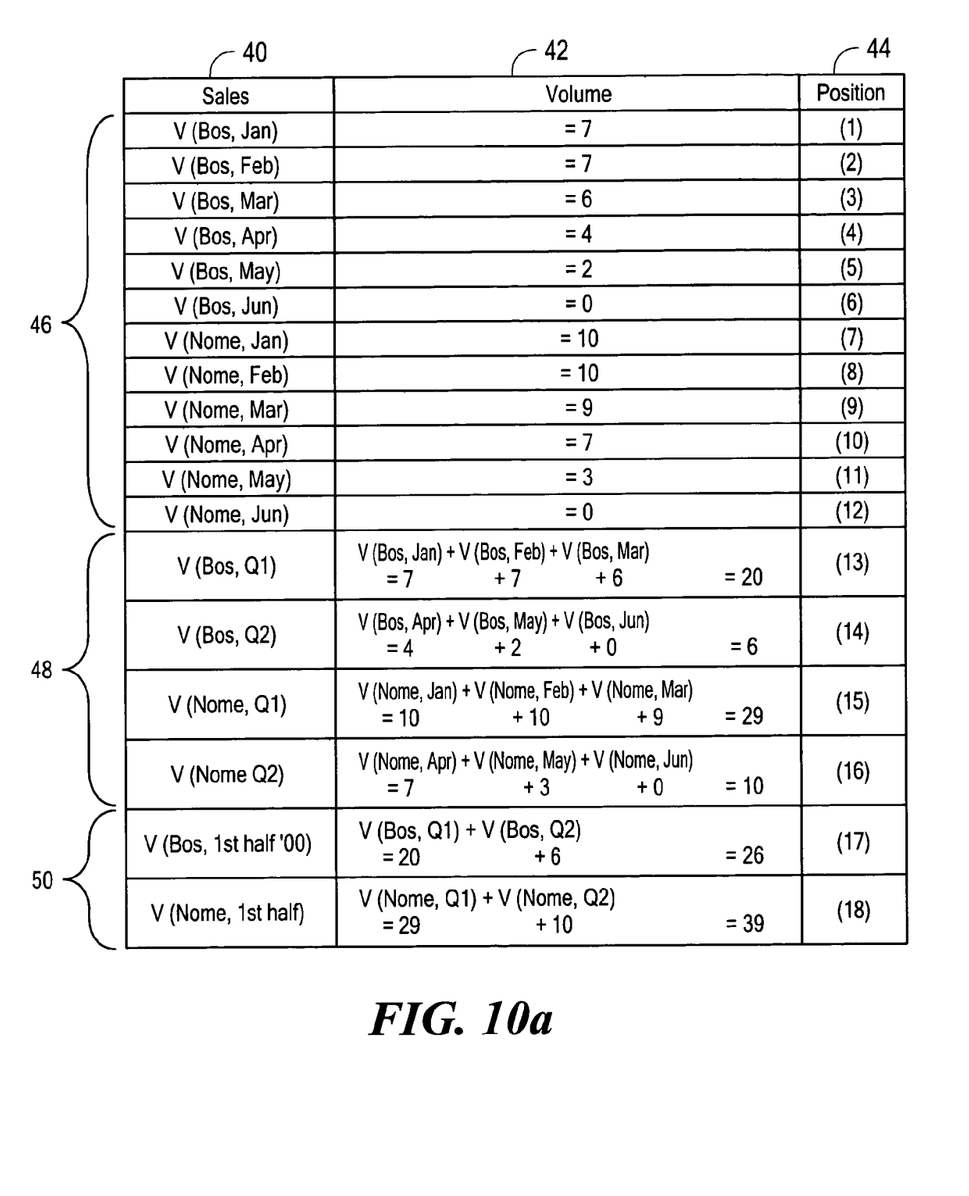
FIGS. 10a, 10b and 10c show an aggregation operation using aggregate data storage corresponding to the hierarchy and data of FIGS. 7a-8b.
Figure 10B:
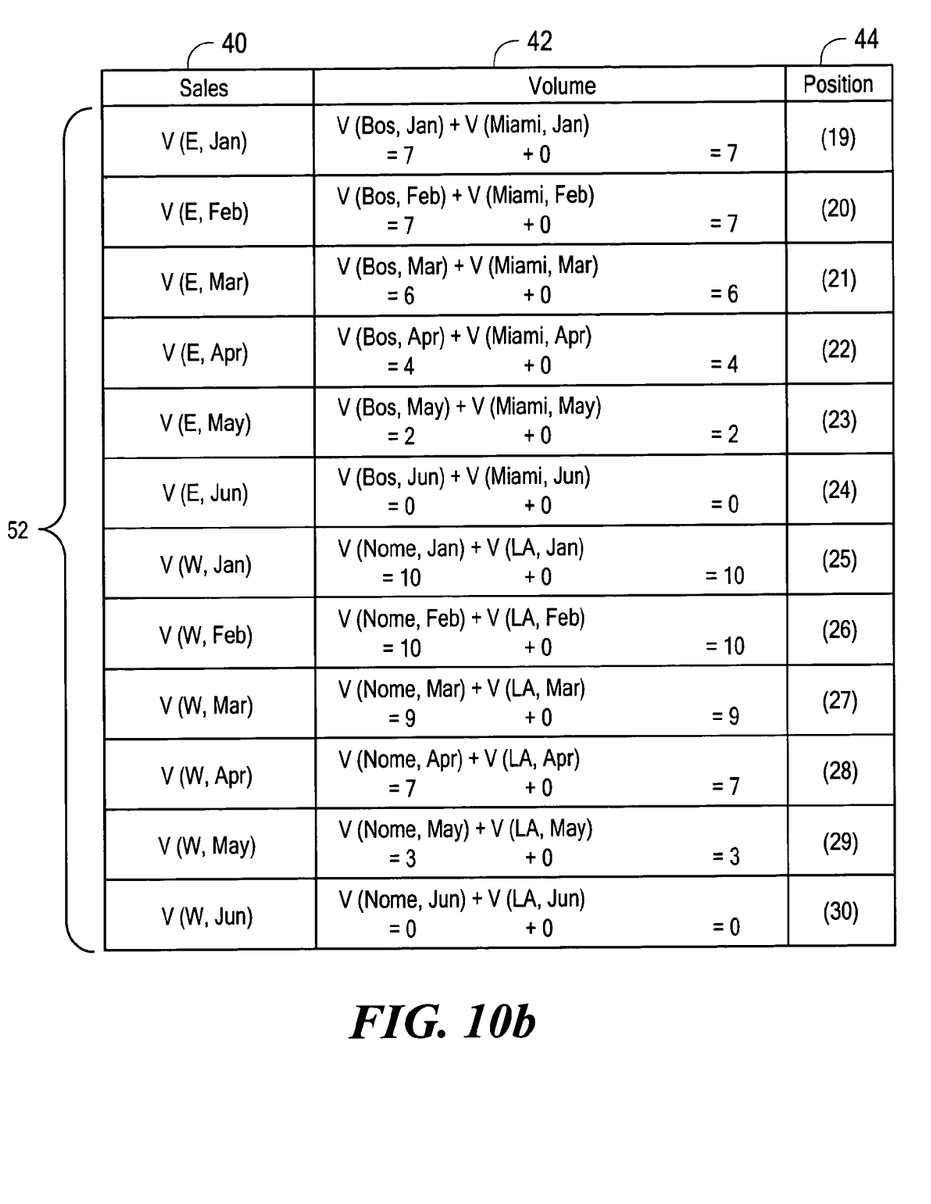

As indicated above, the ordering of the data values on the storage elements in the storage device determines the likelihood that a single fetch will satisfy subsequent data value retrieval attempts. Referring to FIGS. 10a and 10b, ordering of the data values on the storage device is described with respect to an aggregation operation for sales volume V( ) on the time and region dimensions of FIGS. 7a and 7b, respectively, for the product coal as indicated in FIG. 8a.

Referring to FIG. 10a, an aggregation along the time dimension is shown. The data value column 40 indicates the data values from the hierarchy of FIG. 7a, ordered as sales volume V (region, time). The bottom level 46 therefore stores the detail values for V (Bos, Jan . . . Jun) and V (Nome, Jan . . . Jun). The bottom level 46 is retrieved from the storage location position indicated in column 44, to yield the detail values in column 42, corresponding to the detail values of FIG. 8a.

The middle level 48 aggregation involves computing the middle level aggregate values in column 42 from the associated data values on the bottom level 46 detail values, and storing in the storage location indicated column 44. The middle level 48 sales volume, therefore, ranges from V (Bos, Q1 . . . Q2) and V (Nome, Q1 . . . Q2) as indicated by the hierarchy of FIG. 7a.

The top level 50 aggregation involves computing the aggregate value V (Bos, $1^{st}$ half '00) and V (Nome, $1^{st}$ half '00), as indicated in column 40. The resultant aggregate values in column 42 are computed from the associated data values from the middle level 48 aggregate values in column 42, and stored in storage location indicated in column 44.

After the aggregation operation has been completed for the time dimension, the aggregation operation for the region dimension commences, as shown in FIG. 10b. The aggregation operation for the region dimension determines associated data values according to the hierarchy of FIG. 7b. The volume V( ) range therefore includes V (Bos . . . LA, Jan . . . Jun). In this instance, the detail values for V (Bos, Jan . . . Jun) and V (Nome, Jan . . . Jun) are the same detail values used in the time aggregation of FIG. 10a, and V (Miami, Jan . . . Jun) and V (LA, Jan . . . Jun) are sparse, and therefore not applicable, and treated as zero, in the example given. Accordingly, the values for V (E, Jan . . . Jun) and V (W, Jan . . . Jun) in column 40 are computed as shown in column 42, corresponding to the middle level of the region hierarchy 52 of FIG. 7b. The aggregate values associated with V (E, Jan . . . Jun) and V (W, Jan . . . Jun) are stored at the storage locations indicated in column 44.

Figure 10C:
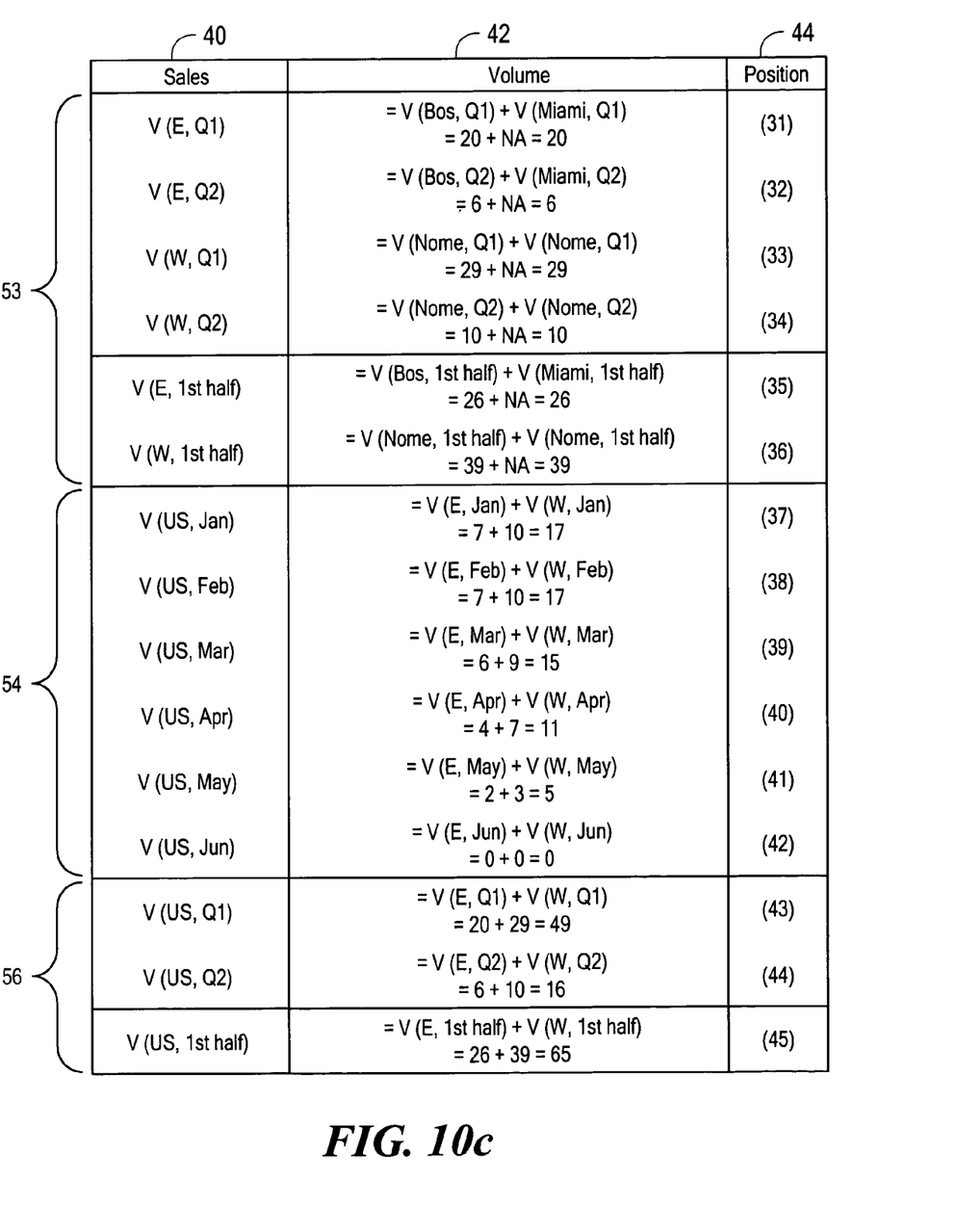

Refer to FIG. 10c, the aggregation for the time dimension are computed for the second level of the region dimension 53 V (E . . . W, Q1 . . . Q2) and V (E . . . W, $1^{st}$ half), and stored in the storage locations indicated in column 44. The top level 54 aggregation, V (US, Jan . . . Jun), aggregates the values associated with V (E, Jan . . . Jun) and V (W, Jan . . . Jun) as shown in column 42, and stores the resultant aggregate values at the storage locations indicated in col. 44 for the top level 54. Finally, V (US, Q1 . . . Q2) and V (US, $1^{st}$ half) complete the aggregation operation for the remaining aggregate values indicated 56. The example given here is illustrative. In a larger multidimensional database, further aggregations could be performed with additional dimensions and attributes defined in the hierarchy.

Figure 11:
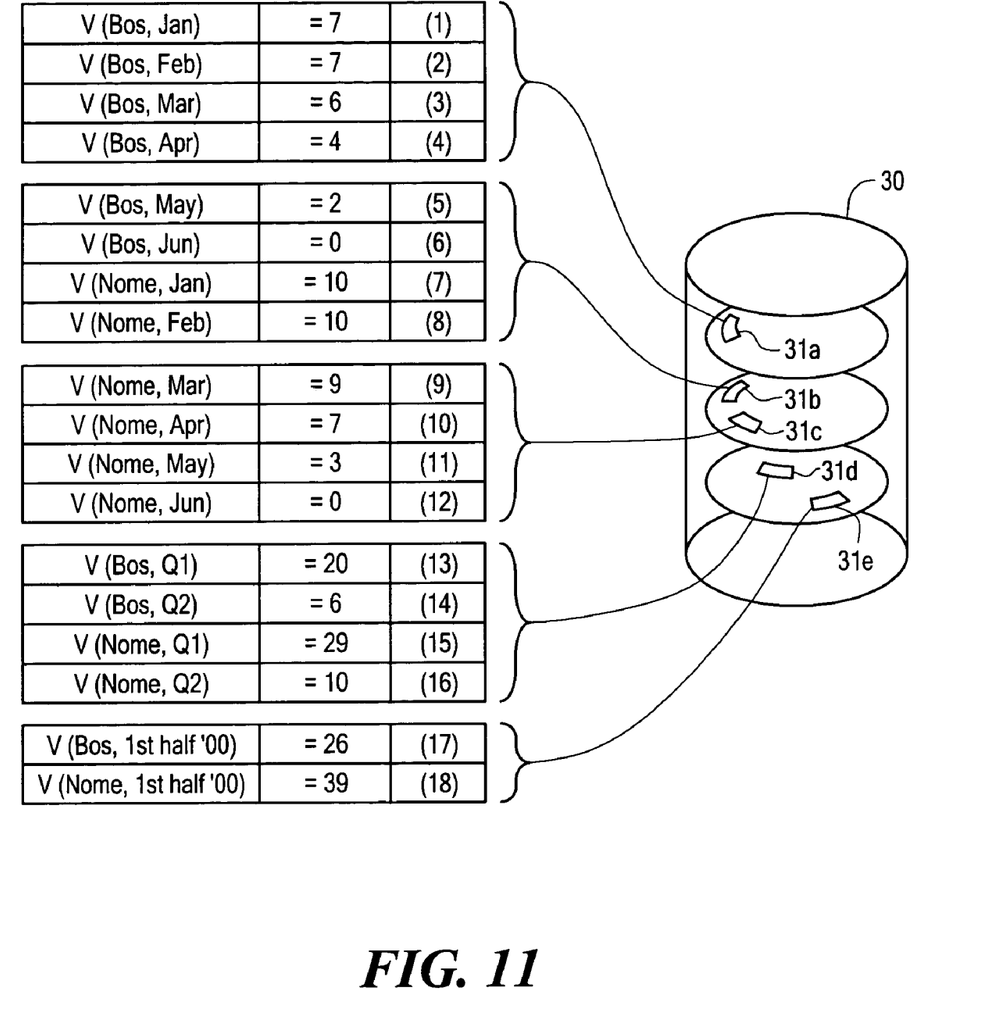
FIG. 11 shows storage of data values on a disk storage medium.

FIG. 11 shows one embodiment employing a disk as the storage medium comprising disk pages as the storage elements. In accordance with the storage location position for the time dimension of FIG. 7a, described above with respect to FIG. 10a, each disk page stores four data values. As indicated earlier, there need not be an exact mapping from aggregate values or hierarchy levels to disk pages. Disk page size, data value size, and cache size may vary from system to system. In accordance with the system as defined by the present claims, the ordering of the data values on the disk is such that a page fetch is likely to result in fetching other, associated data values that will be used in computing the same aggregate value.

Referring to FIG. 11, the disk pages storing the data values of corresponding to column 44 of FIG. 10a is shown. The disk page 31a contains storage locations 1–4 corresponding to V (Bos, Jan . . . Apr). Disk page 31b contains storage locations 5–8 for V (Bos, May . . . Jun) and V (Nome, Jan . . . Feb). Disk page 31c contains storage locations 9–12 for V (Nome, Mar . . . Jun). Disk page 31d contains storage locations 13–16 for aggregate values V (Bos . . . Nome, Q1 . . . Q2). Finally, disk page 31e contains storage locations 17–18 for aggregate values V (Bos . . . Nome, $1^{st}$ half '00), with two remaining storage locations. In this manner, only 5 page fetches from the disk are required for an aggregation operation along the time dimension of FIG. 7a.

Those skilled in the art should readily appreciate that the programs defining the operations and methods defined herein are deliverable to a computer in many forms, including but not limited to a) information permanently stored on non-writeable storage media such as ROM devices, b) information alterable stored on writeable storage media such as floppy disks, magnetic tapes, CDs, RAM devices, and other magnetic and optical media, or c) information conveyed to a computer through communication media, for example using baseband signaling or broadband signaling techniques, as in an electronic networks such as the Internet or telephone modem lines. The operations and methods may be implemented in a software executable out of a memory by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware and software components.

While the system and method for storing data values in a multidimensional database has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of storing data values in a multidimensional database comprising:
    identifying a plurality of dimensions, wherein each of the dimensions is indicative of a plurality of storage locations;
    identifying a hierarchy of attributes within at least one of the dimensions, wherein the hierarchy is indicative of an association between the attributes;
    attributing a plurality of data values to each of the attributes;
    storing the data values on a storage medium based on the data values indicated by the hierarchy and stored on the storage medium in proximity to associated data values, wherein the associated data values are attributed to associated attributes as indicated by the hierarchy, the data values further comprising aggregate values and detail values;
    aggregating at least one of the dimensions having a hierarchy by traversing each of the aggregate values included in the dimension; and
    including, in an aggregation total, the associated data values corresponding to the aggregate value.

2. The method of claim 1 wherein aggregating includes:
    traversing, for a first aggregate value on a first level, each of the data values on a second level associated with the aggregate value; and
    subsequently traversing each of the other aggregate values on the first level via traversing the data values on a second level associated with the subsequent aggregate value.

3. The method of claim 2 wherein traversing further includes
    fetching, from the storage medium, a storage segment having data values corresponding to the aggregate value, wherein each of the corresponding data values are stored in an adjacency.

4. The method of claim 3 wherein the storage segment is a memory cache page.

5. The method of claim 3 wherein the storage segment is a disk page.

6. The method of claim 1 wherein associated values are retrievable by a single fetch.

7. The method of claim 1 further comprising storing related data
    values adjacent to corresponding sparse data values in a sparse matrix represented in the multidimensional database.

8. The method of claim 7 further comprising storing values adjacent
    to values corresponding to a common dimension of the multidimensional database.

9. A method of storing data values in a multidimensional database comprising:
    identifying a plurality of dimensions, wherein each of the dimensions is indicative of a plurality of attributes associated with a data value;
    identifying a hierarchy within at least one of the dimensions, wherein the
    hierarchy is indicative of an association between the plurality of attributes;
    assigning a plurality of data values to each of the plurality of attributes;
    storing the data values on a storage medium in proximity to associated data values, wherein the associated data values are assigned to associated attributes as indicated by the hierarchy, the data values further including aggregate values and detail values;
    aggregating at least one of the dimensions having a hierarchy by traversing
    each of the aggregate values included in the dimension; and
    including, in an aggregation total, the associated data values corresponding to the aggregate value.

10. The method of claim 9 wherein the data values further comprise aggregate values and detail values.

11. The method of claim 10 wherein the association is a parent-child association between an aggregate value and at least one child data value.

12. The method of claim 10 wherein the association is between an aggregate value and at least one data value.

13. The method of claim 10 wherein each of the data values associated with an aggregate value are stored proximate to the other data values associated with the same aggregate value as indicated by the hierarchy.

14. The method of claim 10 wherein storing further comprises storing the aggregate value on the storage medium adjacent to the associated data values.

15. The method of claim 9 further comprising storing related data
    values adjacent to corresponding sparse data values in a sparse matrix represented in the multidimensional database.

16. The method of claim 15 further comprising storing values adjacent
    to values corresponding to a common dimension of the multidimensional database.

* * * * *

UNITED STATES PATENT AND TRADEMARK OFFICE
CERTIFICATE OF CORRECTION

PATENT NO. : 7,165,065 B1
APPLICATION NO. : 09/616643
DATED : January 16, 2007
INVENTOR(S) : Welton et al.

It is certified that error appears in the above-identified patent and that said Letters Patent is hereby corrected as shown below:

Title Page, Item (73) Assignee should read: Oracle International Corporation

Signed and Sealed this

Second Day of June, 2009

JOHN DOLL
*Acting Director of the United States Patent and Trademark Office*